(12) United States Patent
Piacenza et al.

(10) Patent No.: US 8,516,702 B2
(45) Date of Patent: Aug. 27, 2013

(54) METHOD FOR THE MOUNTING, IN THE CORRECT RELATIVE ANGULAR POSITION, OF A PAIR OF ROTARY DRUMS OF A DOUBLE-DRUM SEQUENTIAL GEAR CONTROL DEVICE FOR A MOTOR-VEHICLE GEARBOX

(75) Inventors: Gianni Piacenza, Orbassano (IT);
Valter Pastorello, Orbassano (IT);
Gianluigi Pregnolato, Orbassano (IT);
Marco Garabello, Orbassano (IT);
Andrea Piazza, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 294 days.

(21) Appl. No.: 12/947,346

(22) Filed: Nov. 16, 2010

(65) Prior Publication Data

US 2011/0296690 A1 Dec. 8, 2011

(30) Foreign Application Priority Data

Jun. 3, 2010 (EP) .................................. 10425187

(51) Int. Cl.
*B23P 11/00* (2006.01)
*F16H 61/00* (2006.01)

(52) U.S. Cl.
USPC ........................................ 29/893.2; 74/337.5

(58) Field of Classification Search
USPC .................. 29/893.2, 893.1, 464, 271, 281.5
See application file for complete search history.

(56) References Cited

U.S. PATENT DOCUMENTS

| 2,062,627 | A | * | 12/1936 | Whitehead | 219/107 |
|---|---|---|---|---|---|
| 5,470,286 | A | * | 11/1995 | Fan | 475/331 |
| 6,106,429 | A | * | 8/2000 | Mortensen | 475/331 |
| 7,428,852 | B2 | * | 9/2008 | Baldwin et al. | 74/337.5 |
| 7,753,020 | B2 | * | 7/2010 | Uuzzie et al. | 123/90.31 |
| 2004/0098851 | A1 | * | 5/2004 | Whitehead | 29/281.5 |
| 2006/0162487 | A1 | * | 7/2006 | Chappelear et al. | 74/567 |
| 2007/0209460 | A1 | | 9/2007 | Baldwin et al. | |
| 2009/0095263 | A1 | | 4/2009 | Uuzzie et al. | |
| 2010/0285919 | A1 | * | 11/2010 | Poskie et al. | 475/331 |

FOREIGN PATENT DOCUMENTS

| EP | 1 286 088 A1 | 2/2003 |
|---|---|---|
| EP | 1 500 847 A2 | 1/2005 |

OTHER PUBLICATIONS

European Search Report Issued in Priority Application No. EP 10425187.1 filed on Jun. 3, 2010.

* cited by examiner

*Primary Examiner* — Jermie E Cozart
*Assistant Examiner* — Lee Holly
(74) *Attorney, Agent, or Firm* — Venable LLP; Robert Kinberg

(57) ABSTRACT

A method of mounting a first drum and a second drum of a double-drum sequential gear control device for a motor-vehicle gearbox in a predefined relative angular position, wherein in a mounted condition the first drum and the second drum are rotatably arranged about respective rotation axes parallel to but not coincident with each other, includes forming a first positioning hole in a first position of the first drum, forming a second positioning hole in a second position of the second drum, arranging the first drum and the second drum in the predefined relative angular position, locking the first drum and the second drum in the predefined relative angular position by engaging the first positioning hole and the second positioning hole with a locking device, and unlocking the first drum and the second drum once mounting of the gear control device is completed.

11 Claims, 3 Drawing Sheets

METHOD FOR THE MOUNTING, IN THE CORRECT RELATIVE ANGULAR POSITION, OF A PAIR OF ROTARY DRUMS OF A DOUBLE-DRUM SEQUENTIAL GEAR CONTROL DEVICE FOR A MOTOR-VEHICLE GEARBOX

CROSS-REFERENCE TO RELATED APPLICATION

This application claims the priority of European Patent Application Number EP 10425187.1 filed on Jun. 3, 2010, which is incorporated herein by reference in its entirety.

BACKGROUND

Embodiments of the present invention relate to a double-drum sequential gear control device for a motor-vehicle gearbox. The gear control device includes a first rotary drum associated with a first secondary shaft of the gearbox in order to bring about the movement of one or more engagement sleeves arranged slidably on that shaft, a second rotary drum associated with a second secondary shaft of the gearbox in order to bring about the movement of one or more engagement sleeves arranged slidably on that shaft, and an actuation unit arranged to bring about rotation of the first drum and of the second drum in a synchronized manner. The two drums are rotatably mounted about respective rotation axes which are parallel to but not coincident with each other. More particularly, embodiments of the invention relate to a method for the "phase setting" of the two drums of the above-mentioned gear control device, that is, for positioning them in the correct relative angular position, during the mounting of the control device on the gearbox.

In the following description and claims, the expression "angular position" is intended to relate to the rotary movement of each drum about its rotation axis. In a gear control device such as that defined above, in which both drums are rotated by the same actuation unit which typically comprises an electric motor and a geared transmission mechanism interposed between the electric motor and the two drums, problems may arise at the mounting stage of positioning the two drums with the correct relative orientation to ensure that, in operation, the gear control device can conform to the required gear shift sequence and, above all, does not perform incorrect control operations with the risk of causing damage not only to the gear control device but also to the gearbox.

United States Pre-Grant Publication Number US2006/0162487 provides a sequential gear control device for a motorcycle gearbox comprising a single rotary drum made up of two drum portions which are arranged coaxially with each other and are fixedly connected for rotation with each other by means of a plurality of locking pins. The locking pins ensure the correct relative angular position between the two drum portions of the single drum.

United States Pre-Grant Publication Number US2007/0209460 provides a double-drum sequential gear control device for a motor-vehicle of the same type as the one to which the method of the present application is directed, i.e. a sequential gear control device for a motor-vehicle comprising separate first and second drums which are rotatably mounted about respective first and second rotation axes parallel to each other.

SUMMARY

An object of the present invention is a method which enables the two drums of a gear control device of the type defined above to be positioned in the correct relative angular position at the stage of mounting on the vehicle, that is, to be positioned with the correct relative orientation, without possibility of error by the operator responsible for the assembly.

These and other objects are achieved in full, according to embodiments of the present invention, by a method comprising the steps of:

forming a positioning hole in a given position of the first drum and a positioning hole in a given position of the second drum;

arranging the first and second drums in a predefined relative angular position;

locking the first and second drums in such predefined relative angular position by engaging their positioning holes by means of locking means; and disengaging the locking means from the positioning holes of the first and second drums once the mounting of the gear control device is completed.

According to another embodiment of the invention, there is provided a method of mounting a first drum and a second drum of a double-drum sequential gear control device for a motor-vehicle gearbox in a predefined relative angular position, wherein, in a mounted condition, the first drum is rotatably arranged about a first rotation axis and the second drum is rotatably arranged about a second rotation axis parallel to but not coincident with the first rotation axis, the method comprising: forming a first positioning hole in a first position of the first drum and forming a second positioning hole in a second position of the second drum; arranging the first drum and the second drum in the predefined relative angular position; locking the first drum and the second drum in the predefined relative angular position, the locking including engaging the first and second positioning holes with a locking device; and disengaging the locking device from the first and second positioning holes of the first and second drums once mounting of the gear control device is completed.

According to another embodiment of the invention, the first positioning hole of the first drum extends parallel to and spaced from the first rotation axis. Further, the second positioning hole of the second drum extends parallel to and spaced from the second rotation axis. The forming also may include extending the first positioning hole parallel to and spaced from the first rotation axis. The forming also may include extending the second positioning hole of the second drum parallel to and spaced from the second rotation axis. At least one of the first positioning hole of the first drum or the second positioning hole of the second drum may be a radial hole.

According to another embodiment, the locking may includes using the locking device having a first pin insertable into the first positioning hole of the first drum, a second pin insertable into the second positioning hole of the second drum, and a connecting element which connects the first pin and second pin to one another, wherein the connecting element is configured to permit simultaneous insertion of the first and second pins into the respective positioning holes solely in the predefined relative angular position of the drums. The first pin, the second pin and the connecting element may include a single locking member.

According to yet another embodiment, the method includes forming a third and a fourth positioning hole in a housing of the motor-vehicle gearbox, the third and fourth positioning holes being aligned with the first and second positioning holes of the first and second drums, respectively, when the first and second drums are in the predefined relative angular position; and wherein the locking includes using the locking device having a first pin insertable into both the first positioning hole of the first drum and the third positioning hole of the housing and a second pin insertable into both the second positioning hole of the second drum and the fourth positioning hole of the housing.

By virtue of the insertion of the locking device or means in the positioning holes of the two drums, the two drums are held in the desired relative angular position until the completion of the mounting of the control device, thus preventing the risk of either incorrect initial positioning or accidental relative movement of the drums during mounting.

According to another embodiment of the invention, the locking device may be arranged to connect the two drums to one another directly. The device may include a first pin suitable for being inserted into the positioning hole of the first drum, a second pin suitable for being inserted into the positioning hole of the second drum, and a connecting element which connects the first and second pins to one another and is configured to permit the simultaneous insertion of the pins into the respective positioning holes with the drums arranged in the said relative angular position. In this case, the two pins and the connecting element are formed by a single locking member. The connecting element may be provided with a handle to facilitate the fitting of the locking member by the operator. According to this embodiment, therefore, the operator initially may position the two drums in the correct relative angular position and then lock them in that position by fitting the locking member on the drums to insert the pins of the locking member into the respective positioning holes of the drums.

According to another embodiment of the invention, the locking device may be arranged to connect each of the two drums to the gearbox housing and hence to connect the two drums to one another indirectly. The locking device may include a first pin suitable for being inserted into the positioning hole of the first drum and into a corresponding first positioning hole in the gearbox housing when said holes are aligned with one another, and a second pin suitable for being inserted into the positioning hole of the second drum and into a corresponding second positioning hole in the gearbox housing when said holes are aligned with one another. The positions of the two positioning holes in the gearbox housing may be defined in a manner such that, when the two drums are prevented from rotating as a result of the insertion of the pins into the respective positioning holes of the drums and of the gearbox housing, the two drums are in the said relative angular position. According to this embodiment, therefore, the operator first may lock one of the two drums rotationally by inserting a pin into the positioning hole of that drum and into the corresponding positioning hole in the gearbox housing and then locks the other drum rotationally by inserting a pin into the positioning hole of that drum and into the corresponding positioning hole in the gearbox housing.

BRIEF DESCRIPTION OF THE DRAWINGS

Further characteristics and advantages of the present invention will become clear from the following detailed description which is given purely by way of non-limiting example with reference to the appended drawings, in which.

DETAILED DESCRIPTION

Figure 1:
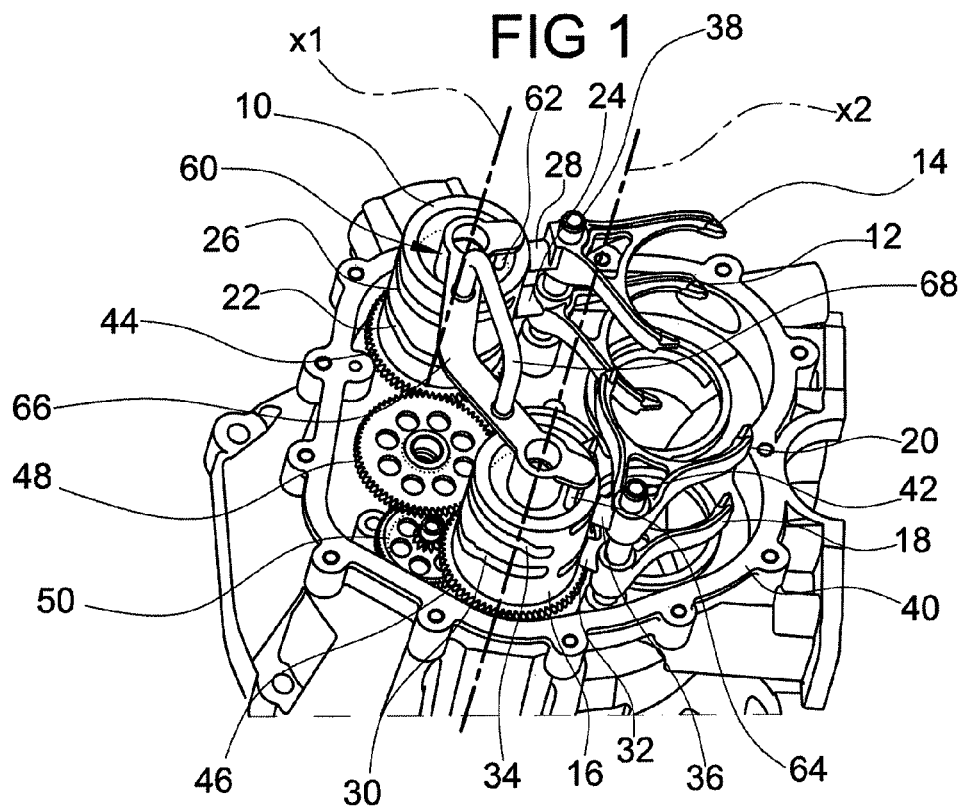
FIG. 1 is a perspective view of a double-drum, sequential gear control device for a motor-vehicle gearbox in the condition in which the two drums are locked in a given relative angular position in accordance with a first preferred embodiment of the present invention.

With reference to the drawings, a double-drum, sequential gear control device for a motor-vehicle gearbox includes:

a first drum 10 rotatably mounted about a first rotation axis X1 which coincides with the geometrical axis of the drum and is arranged parallel to the axes of the shafts of the gearbox;

a first pair of engagement forks 12 and 14 slidably mounted along an axis parallel to the rotation axis X1 under the control of the first drum 10 in order to bring about the movement of one or more engagement sleeves (not shown) slidably mounted on a first secondary shaft (also not shown) of the gearbox, between respective neutral and engagement positions;

a second drum 16 rotatably mounted about a second rotation axis X2 which coincides with the geometrical axis of the drum and is arranged parallel to the axes of the shafts of the gearbox, as well as to the first rotation axis X1, the second rotation axis X2 being parallel to but not coincident with the first rotation axis X1;

a second pair of engagement forks 18 and 20 slidably mounted along an axis parallel to the rotation axis X2 (and hence also to the rotation axis X1) under the control of the second drum 16 in order to bring about the movement of one or more engagement sleeves (not shown) slidably mounted on a second secondary shaft (also not shown) of the gearbox, between respective neutral and engagement positions; and an actuation unit arranged to bring about rotation of the two drums 10 and 16 in a synchronized manner.

In the embodiment shown in the drawings, the gear control device is associated with a gearbox comprising two engagement sleeves associated with the first secondary shaft and two engagement sleeves associated with the second secondary shaft but, clearly, the invention is applicable to a gear control device associated with a gearbox having a number of engagement sleeves other than that of the embodiment considered herein.

In order to convert the rotary movements of the two drums about the respective rotation axes into translatory movements of the respective pairs of engagement forks, the engagement forks are connected for translation axially (where the term "axial" will refer hereinafter to a direction parallel to the direction of the rotation axes of the two drums) by respective pegs (or other follower members) which slidably engage in respective guide grooves provided in the outer cylindrical surfaces of the drums. More specifically, the outer cylindrical surface of the first drum 10 is provided with a first guide groove 22 slidably engaged by a first peg 24 which is connected for translation axially with the engagement fork 12, and a second guide groove 26 slidably engaged by a second peg 28 which is connected for translation axially with the engagement fork 14, and the outer cylindrical surface of the second drum 16 is provided with a first guide groove 30 slidably engaged by a first peg 32 which is connected for translation axially with the engagement fork 18, and a second guide groove 34 slidably engaged by a second peg 36 which is connected for translation axially with the engagement fork 20. The engagement forks 12 and 14 controlled by the first drum 10 are slidably mounted along a stationary rod 38 supported by a housing 40 of the gearbox but they could also be mounted to be fixed for translation with an axially slidable rod. Similarly, the engagement forks 18 and 20 controlled by the second drum 16 are slidably mounted along a stationary rod 42 supported by the housing 40 but they could also be mounted to be fixed for translation with an axially slidable rod.

The actuation unit basically comprises a motor (not shown), for example, an electric motor, and a geared transmission mechanism which is arranged to transmit the rotary movement generated by the motor to the two drums and to synchronize the rotary movements of the two drums. More specifically, the geared transmission mechanism comprises a first gear 44 which is arranged coaxially with the first drum 10 and is connected thereto to be fixed for rotation therewith, a second gear 46 which is arranged coaxially with the second drum 16 and is connected thereto to be fixed for rotation therewith, a third gear 48 (hereinafter referred to as the intermediate gear) permanently meshing with both of the gears 44 and 46, and a pinion (not shown) carried by an output shaft of the motor (also not shown). The pinion meshes indirectly with one of the two gears 44 and 46 (in the present case with the gear 46) via a reduction gear 50 constituted, for example, by a double gear, but could also mesh directly with the gear 46 (or 44). The rotary movement imparted to the pinion by the motor is thus transmitted to the gear 46 of the second drum 16 and, via the intermediate gear 48, to the gear 44 of the first drum 10. The two drums 10 and 16 thus rotate in synchronized manner, that is to say, a given angular position of the two drums corresponds to a given angular position of the motor, and hence of the pinion.

In order to ensure the correct relative angular positioning of the two drums 10 and 16 at the stage of the mounting of the gear control device, according to the invention, the two drums have respective positioning holes into which respective pins can be inserted as locking devices to lock the two drums in a predefined relative angular position.

Figure 2:
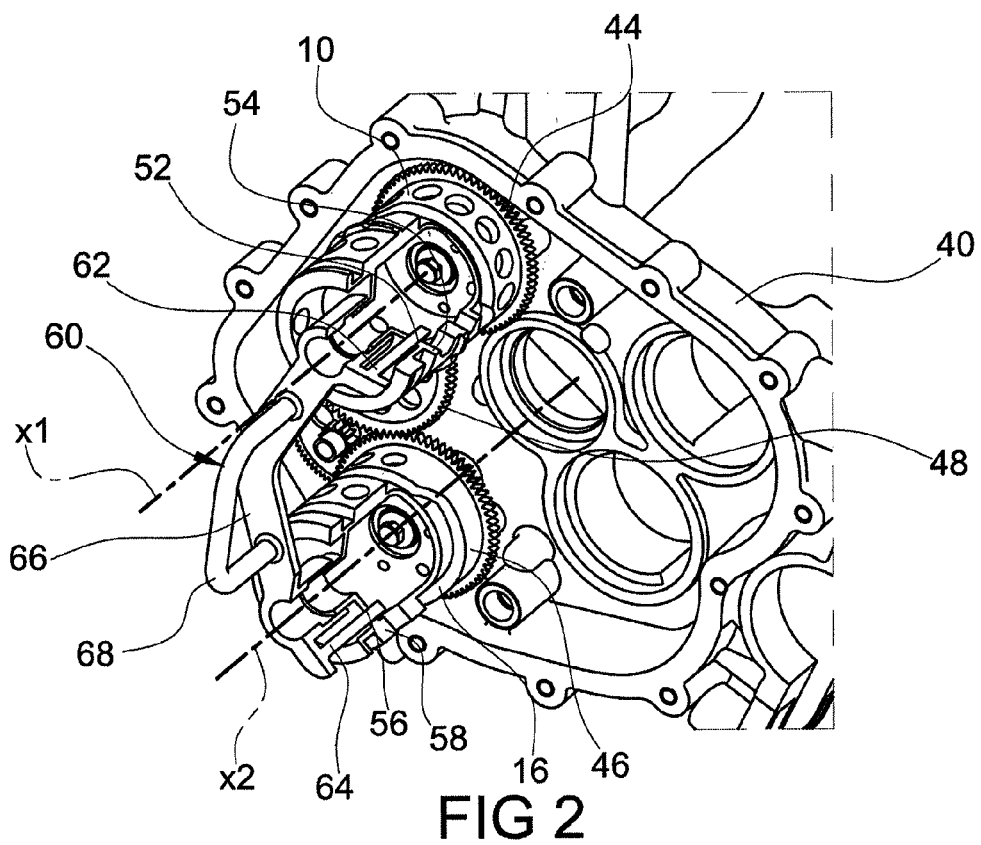
FIG. 2 is a perspective view of the gear control device of FIG. 1, in which the two drums are shown cut away.

In the embodiment shown in FIGS. 1 and 2, the first drum 10 has a first positioning hole 52 which is formed as a through-hole in a first wall 54 of the drum perpendicular to the rotation axis X1, and which extends parallel to but spaced from the rotation axis X1. Similarly, the second drum 16 has a second positioning hole 56 which is formed as a through-hole in a first wall 58 of the drum perpendicular to the rotation axis X2, and which extends parallel to but spaced from the rotation axis X2. At the stage of the mounting of the gear control device on the gearbox, the two drums 10 and 16 are locked in the predefined relative angular position by means of a locking member 60 comprising a first pin 62 intended to be inserted into the positioning hole 52 of the first drum, a second pin 64 intended to be inserted into the positioning hole 56 of the second drum 16 and a connecting element 66 which connects the two pins 62 and 64 to one another. The locking member 60 is configured to permit simultaneous insertion of the pins 62 and 64 into the respective positioning holes 52 and 56 solely when the drums 10 and 16 are arranged in the predefined relative angular position. The connecting element 66 is advantageously provided with a handle 68 to facilitate the fitting of the locking member 60 by the operator. In the embodiment illustrated, the locking member 60 is formed as a single piece integrally forming the two pins 62 and 64 and the connecting element 66. In this case, therefore, after the operator has positioned the two drums 10 and 16 in the predefined relative angular position, he fits the locking member 60 in a single operation by inserting its pins 62 and 64 into the positioning holes 52 and 56 of the two drums. Naturally, the locking member 60 will be removed once the mounting of all the components of the gear control device is completed.

Alternately, the pins 62 and 64 and the connecting element 66 could be formed as separate parts. In this case, therefore, after the operator has positioned the two drums 10 and 16 in the predefined relative angular position, he inserts the respective pins 62 and 64 into each of the positioning holes 52 and 56 of the two drums and then connects the pins by means of the connecting element 66 to lock the pins, and with them the drums, in said position.

Alternately, the positioning holes of the two drums may also be radial through-holes formed through the cylindrical walls of the respective drums.

Figure 3:
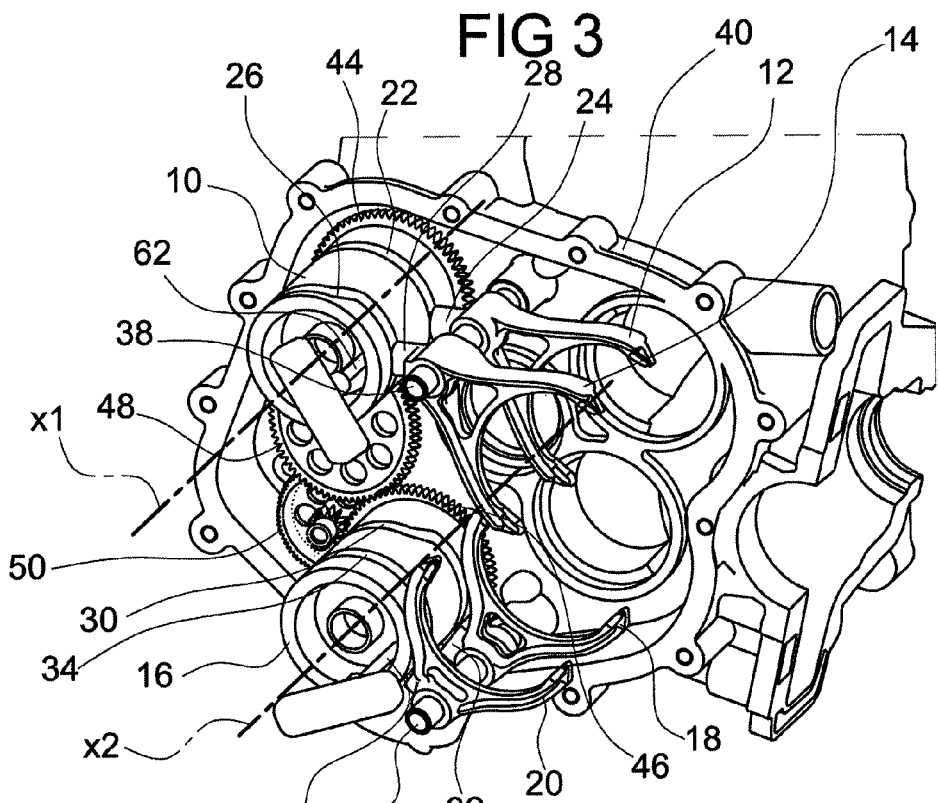
FIG. 3 is a perspective view of a double-drum, sequential gear control device for a motor-vehicle gearbox in the condition in which the two drums are locked in a given relative angular position in accordance with a second preferred embodiment of the present invention.
Figure 4:
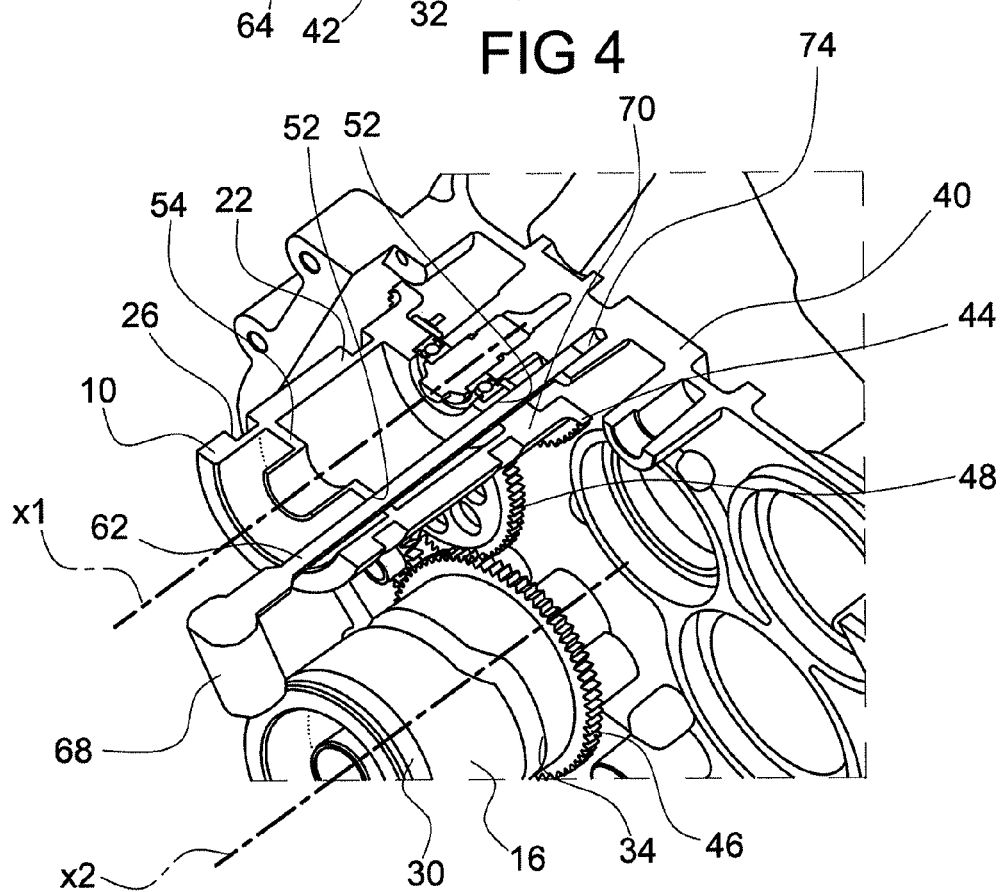
FIG. 4 is a perspective view of the gear control device of FIG. 3, in which one of the two drums is shown sectioned in a plane extending through its own rotation axis.
Figure 5:
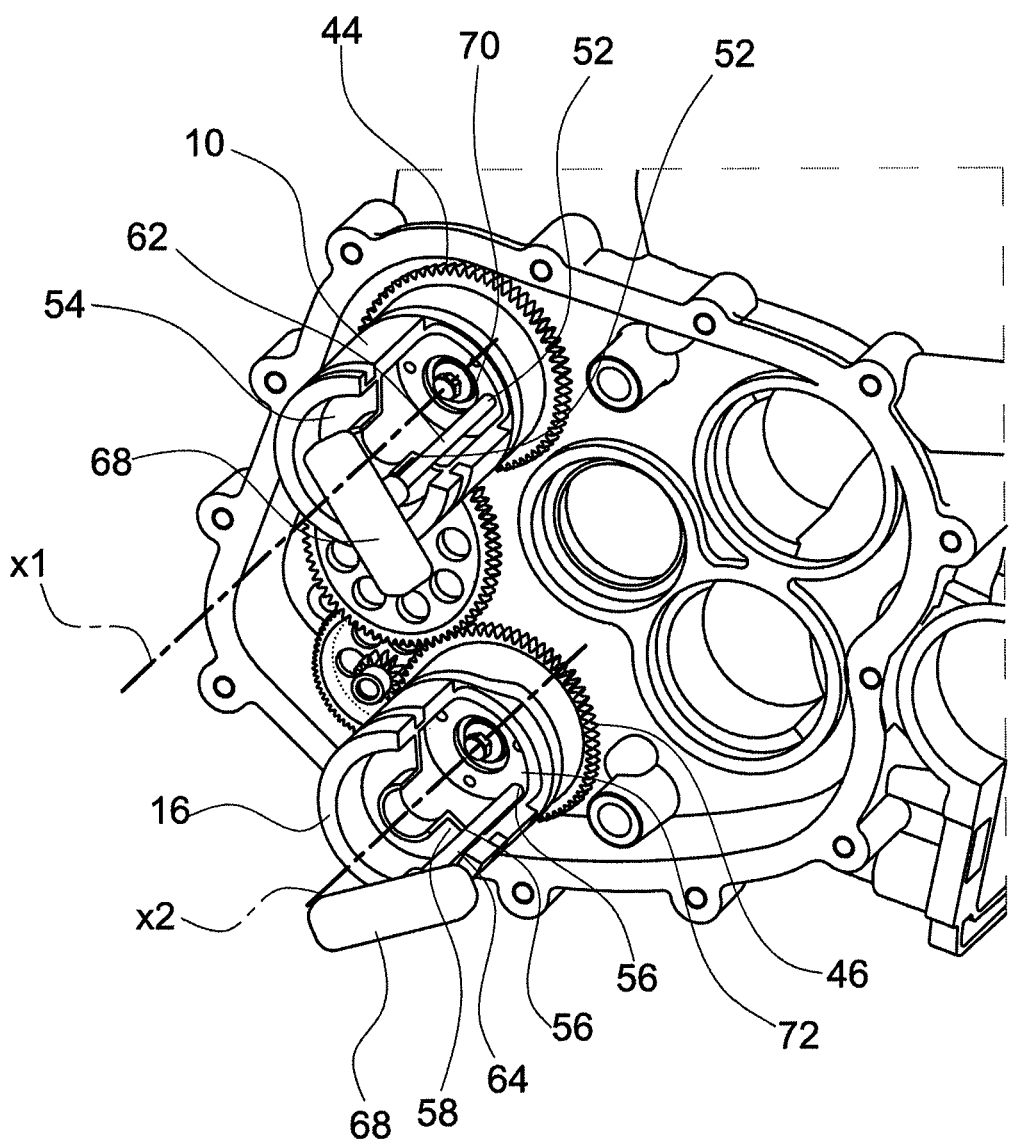
FIG. 5 is a perspective view of the gear control device of FIG. 3, in which the two drums are shown cut away.

In the embodiment shown in FIGS. 3 to 5, in which parts and elements that are identical or correspond to those of FIGS. 1 and 2 have been attributed the same reference numerals, the first positioning hole 52 of the first drum 10 is again formed as a through-hole which extends parallel to but spaced from the rotation axis X1, through the entire drum, thus extending both through the first wall 54 and through a second wall 70 of the drum parallel to the first (and hence also perpendicular to the rotation axis X1). Similarly, the second positioning hole 56 of the second drum 16 is again formed as a through-hole which extends parallel to but spaced from the rotation axis X2, through the entire drum, thus extending both through the first wall 58 and through a second wall 72 of the drum parallel to the first (and hence also perpendicular to the rotation axis X2). Moreover, in this case, the housing 40 has a third positioning hole 74 and a fourth positioning hole (not shown, but similar to the first hole 74) which extend parallel to the axes X1 and X2 of the two drums 10 and 16, and hence parallel to the positioning holes 52 and 56 of the drums, and which are positioned in such a manner that each is aligned with the positioning hole of a drum when the drums are in the predefined relative angular position.

With the two drums 10 and 16 arranged in said position, therefore, the first positioning hole 52 of the first drum 10 is aligned with the third positioning hole 74 of the housing 40 and the operator can therefore insert a first pin 62 into the two holes to lock that drum rotationally. Likewise, the second positioning hole 56 of the second drum 16 is aligned with the fourth positioning hole of the housing 40. The operator can therefore insert a second pin 64 into the two holes to lock that drum rotationally. Naturally, the pins 62 and 64 of the embodiment of FIGS. 3 to 5 will be longer than the corresponding pins 62 and 64 of the embodiment of FIGS. 1 and 2, since they have to extend through the entire respective drums and be inserted into the respective positioning holes in the housing. Each of the pins 62 and 64 is also provided with a respective handle 68 at a respective end to facilitate the insertion and removal of the pins by the operator.

During the mounting of the gear control device on the gearbox, the two drums 10 and 16 are thus locked in the predefined relative angular position, in which the first positioning hole 52 of the first drum 10 is aligned with the third positioning hole 74 of the housing 40 and the second positioning hole 56 of the second drum 16 is aligned with the fourth positioning hole of the housing 40, by the insertion of the first pin 62 into the respective holes of the first drum and of the housing and of the second pin 64 into the respective holes of the second drum and of the housing. Naturally, the pins are removed from the respective holes once the mounting of all the components of the gear control device is completed.

Naturally, the principle of the invention remaining unchanged, the embodiments and details of construction may be varied widely with respect to those described and illustrated purely by way of non-limiting example.

What is claimed is:

1. A method of mounting a first drum and a second drum of a double-drum sequential gear control device for a motor-vehicle gearbox in a predefined relative angular position, wherein, in a mounted condition, the first drum is rotatably arranged about a first rotation axis and the second drum is rotatably arranged about a second rotation axis parallel to but not coincident with the first rotation axis, the method comprising:

forming a first positioning hole in a first position of the first drum and forming a second positioning hole in a second position of the second drum;

forming a third and a fourth positioning hole in a housing of the motor-vehicle gearbox, the third and fourth positioning holes being aligned with the first and second positioning holes of the first and second drums, respectively, when the first and second drums are in the predefined relative angular position;

arranging the first drum and the second drum in the predefined relative angular position;

locking the first drum and the second drum in the predefined relative angular position, the locking including engaging the first and second positioning holes with a locking device, and wherein the locking includes using the locking device having a first pin insertable into both the first positioning hole of the first drum and the third positioning hole of the housing and a second pin insertable into both the second positioning hole of the second drum and the fourth positioning hole of the housing; and disengaging the locking device from the first and second positioning holes of the first and second drums once mounting of the gear control device is completed.

2. The method according to claim 1, wherein the first positioning hole of the first drum extends parallel to and spaced from the first rotation axis.

3. The method according to claim 1, wherein the second positioning hole of the second drum extends parallel to and spaced from the second rotation axis.

4. The method according to claim 1, wherein at least one of the first positioning hole of the first drum or the second positioning hole of the second drum is a radial hole.

5. The method according to claim 1, further comprising a connecting element which connects the first pin and second pin to one another, wherein the connecting element is configured to permit simultaneous insertion of the first and second pins into the respective positioning holes solely in the predefined relative angular position of the drums.

6. The method according to claim 5, wherein the first pin, the second pin and the connecting element comprise a single locking member.

7. The method according to claim 1, wherein forming includes extending the first positioning hole parallel to and spaced from the first rotation axis.

8. The method according to claim 1, wherein forming includes extending the second positioning hole of the second drum parallel to and spaced from the second rotation axis.

9. A method of mounting a first drum and a second drum of a double-drum sequential gear control device for a motor-vehicle gearbox in a predefined relative angular position, wherein, in a mounted condition, the first drum is rotatably arranged about a first rotation axis and the second drum is rotatably arranged about a second rotation axis parallel to but not coincident with the first rotation axis, the method comprising:

forming a first positioning hole in a first position of the first drum and forming a second positioning hole in a second position of the second drum;

forming a third and a fourth positioning hole in a housing of the motor-vehicle gearbox, the third and fourth positioning holes being aligned with the first and second positioning holes of the first and second drums, respectively, when the first and second drums are in the predefined relative angular position;

arranging the first drum and the second drum in the predefined relative angular position;

locking the first drum and the second drum in the predefined relative angular position by inserting a first pin both into the first positioning hole and into the third positioning hole and a second pin both into the second positioning hole and into the fourth positioning hole; and disengaging the first pin from the first and third positioning holes and disengaging the second pin from the second and fourth positioning holes once mounting of the gear control device is completed.

10. The method according to claim 9, wherein the first positioning hole of the first drum extends parallel to and spaced from the first rotation axis.

11. The method according to claim 9, wherein the second positioning hole of the second drum extends parallel to and spaced from the second rotation axis.

* * * * *